| United States Patent [19] | [11] Patent Number: 4,789,002 |
|---|---|
| Williams | [45] Date of Patent: * Dec. 6, 1988 |

[54] FLUID VALVE STRUCTURES

[75] Inventor: Arthur Williams, Masury, Ohio

[73] Assignee: Commercial Shearing, Inc., Youngstown, Ohio

[*] Notice: The portion of the term of this patent subsequent to Dec. 1, 2004 has been disclaimed.

[21] Appl. No.: 31,231

[22] Filed: Mar. 26, 1987

Related U.S. Application Data

[63] Continuation of Ser. No. 820,262, Jan. 17, 1986, Pat. No. 4,709,724.

[51] Int. Cl.$^4$ ............................................. F15B 13/08
[52] U.S. Cl. ..................................... 137/596; 91/447; 137/625.69
[58] Field of Search ............... 137/596, 625.69, 596.12; 91/447

[56] References Cited

U.S. PATENT DOCUMENTS 3,221,770 12/1965 Faisandier .
3,381,587 5/1968 Parquet .
3,548,860 12/1970 Jacobs .
3,613,508 11/1971 Krehbiel .
3,717,175 2/1973 Boydell .
4,709,724 12/1987 Williams .............................. 137/596

Primary Examiner—Gerald A. Michalsky
Attorney, Agent, or Firm—Buchanan Ingersoll

[57] ABSTRACT

A fluid valve structure is provided having spaced first and second inlet sections connected to a source of pressure fluid and a plurality of side by side valve sections between said inlet sections, each having inlet, work and tank chambers intersected by a passage open at opposite ends to a control chamber and a tank chamber at a common pressure, a valve spool movable in said passage and having both ends at a common pressure and grooves adapted selectively to connect the work chamber to the inlet or tank chamber, a lever in the control chamber removably engaging one end of the spool and rotatable about a shaft transverse to the spool axis, and an external handle means operatively engaging the shaft to rotate the lever to move the spool axially in the passage, all of the spool, lever and shaft being fully enclosed with a valve housing in all operative positions.

44 Claims, 8 Drawing Sheets

FLUID VALVE STRUCTURES

This application is a continuation of my copending application Ser. No. 820,262, filed Jan. 17, 1986, now U.S. Pat. No. 4,709,724.

This invention relates to fluid valve structures and particularly to fluid valves for multivalve assemblies for mobile equipment such as motor graders and the like.

Fluid valve structures have been used for many years and have taken a great variety of configurations and operating characteristics. A very common and universally used fluid valve is the axially movable spool valve which may be assembled in side by side relationship with like other valves to form a bank of valves capable of operating a multiplicity of fluid consumers. Such valves have been used for many years. They have, however, many defects and limitations both in uses and operation. They are subject to considerable frictional forces due to the seals through which at ends of the spool pass. The exposed ends are subject to wear from dirt which carries into the seal and damages both the seal and spool. This wear causes the seals to fail and leak.

An additional problem with the conventional method of moving the spool by the axially applied manual forces is that these forces can be very large when the spool reaches its stop position. These large forces can distort the spool causing it to bind in its close fit bore or damage the relatively fragile end stop parts.

The present invention utilizes a rotary input to the fluid chamber and a lever from this rotary input to the spool to move the spool axially. This arrangement solves all of the previously cited problems by providing a valve structure which reduces frictional forces due to seals to a minimum and eliminates the movement of any element from a hydraulic (wet) chamber to a dry area as the spool is stroked from position to position which excludes external dirt from any part of the valve spool. In addition, it provides rugged end stops on the housing to limit spool motion without transmitting any end stop forces through the spool or the lever arrangement.

This rotary input arrangement allows disassembly of the spool from the valve section without removing the section from the valve bank similar to conventional spools which have thru axial seals. In addition, it allows the input arm to float axially so that it cannot cause the spool to bind as it is stroked. Other rotary input arrangements have been used for mobile valves, but they do not solve the problems of high frictional forces, exclusion of dirt, and large manual forces being transmitted directly through the spool to limit the spool motion; because the rotary input has been accomplished outside of the fluid cavity.

In the valve according to the invention one can also provide a unique arrangement of spool and land timing so that flow forces are minimized by the design of spool flow slots while separate spool venting slots allow both work ports to vent to the tank when the spool is in neutral, insuring the proper seating of the pilot operated check valves. This arrangement also provides system pressure to open the load holding check valves after the spool moves to shut off the spool vent slots to tank connection and the spool flow slots direct system pressure to either one of the two work ports.

The valve may also provide a detented fourth position float in which the spool opens both work ports to the tank and directs pressure to dual pistons to open both load holding checks when the spool is moved to a float position.

A fourth feature of this valve is that the detent used to hold the spool in the float position does not cause any frictional drag on the spool until the spool enters the float position.

A final feature of this valve is that an external pressure passage parallel the internal valve pressure passage may be provided connecting a first inlet section to a second inlet section at opposite ends of a multi-valve bank. This parallel passage provides inlet fluid pressure at both ends of the valve bank to minimize pressure losses in providing fluid flow to the intermediate valve sections.

We provide a fluid valve structure comprising a first inlet section separately connected to a source of pressure fluid and to a reservoir or tank, a second inlet section connected to a source of pressure from the first inlet section, a plurality of side by side valve sections between said inlet and second inlet sections, each valve section having a housing with a pressure source chamber, two work chambers and a tank chamber, intersected by a passage open at both ends to the tank chamber, a valve spool having both ends in the tank chamber and being movable in said passage, lever means in said tank chamber, said lever being rotatable with a shaft located transverse to and spaced from the axis of the spool valve, handle means to rotate the shaft whereby the valve spool moves axially in the passage, parallel passage means connecting said first inlet section and said second inlet section and priority valve means in said first inlet section dividing pressure fluid entering the first inlet section primarily to an auxiliary port for steering and secondarily to the first inlet section pressure chamber and through the external parallel passage to the second inlet section pressure chamber.

Preferably the lever means is removably fixed in a shaft extending through the housing spaced from the valve spool in a plane transverse to its axis, both ends of said shaft extending out of the housing through a seal and at least one end connected to an operating lever moving between fixed end stops on the housing. The spool is preferably removable from the passage at that end opposite the lever means after removal of the lever means. Means are preferably provided to vent the work ports to the tank when the spool is centered in neutral position. Preferably means are provided in the work section whereby system pressure opens the load holding checks after the spool moves to close the work port to tank connection. A detented fourth position float (both work ports wide open to tank) may be provided at which position the spool directs pressure to dual pistons, opening both load holding checks when the spool is into this detented fourth float position. When not in this detented fourth float position the metering and load holding checks are opened by the two pistons operating as a single piston.

In the foregoing general description I have set out certain purposes, objects and advantages of my invention. Other purposes, objects and advantages of the invention will, however, be apparent from a consideration of the following description and the accompanying drawings in which FIG. 1 is a top plan view of a valve bank assembly according to the invention;

Figure 1:
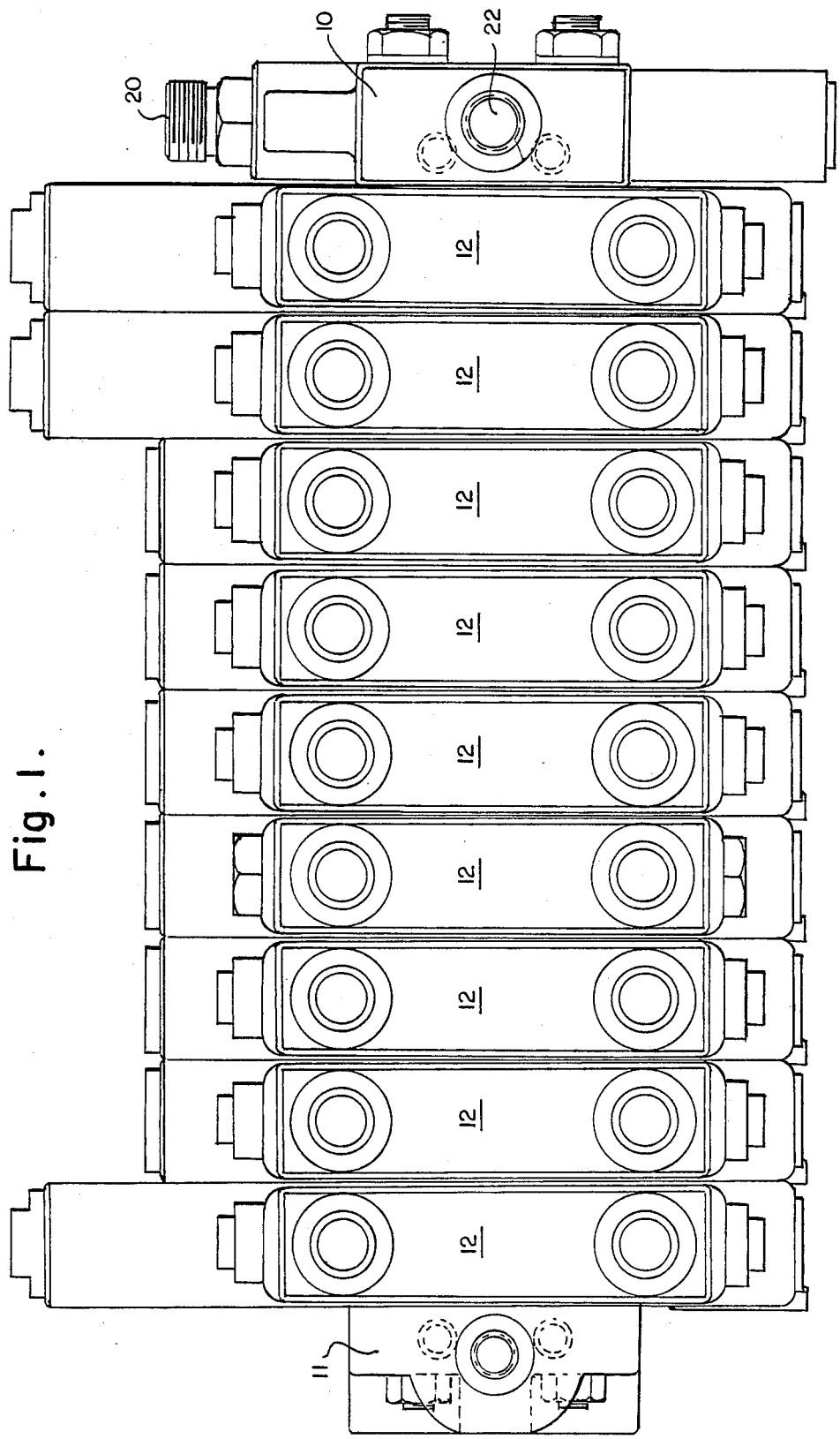
Figure 2:
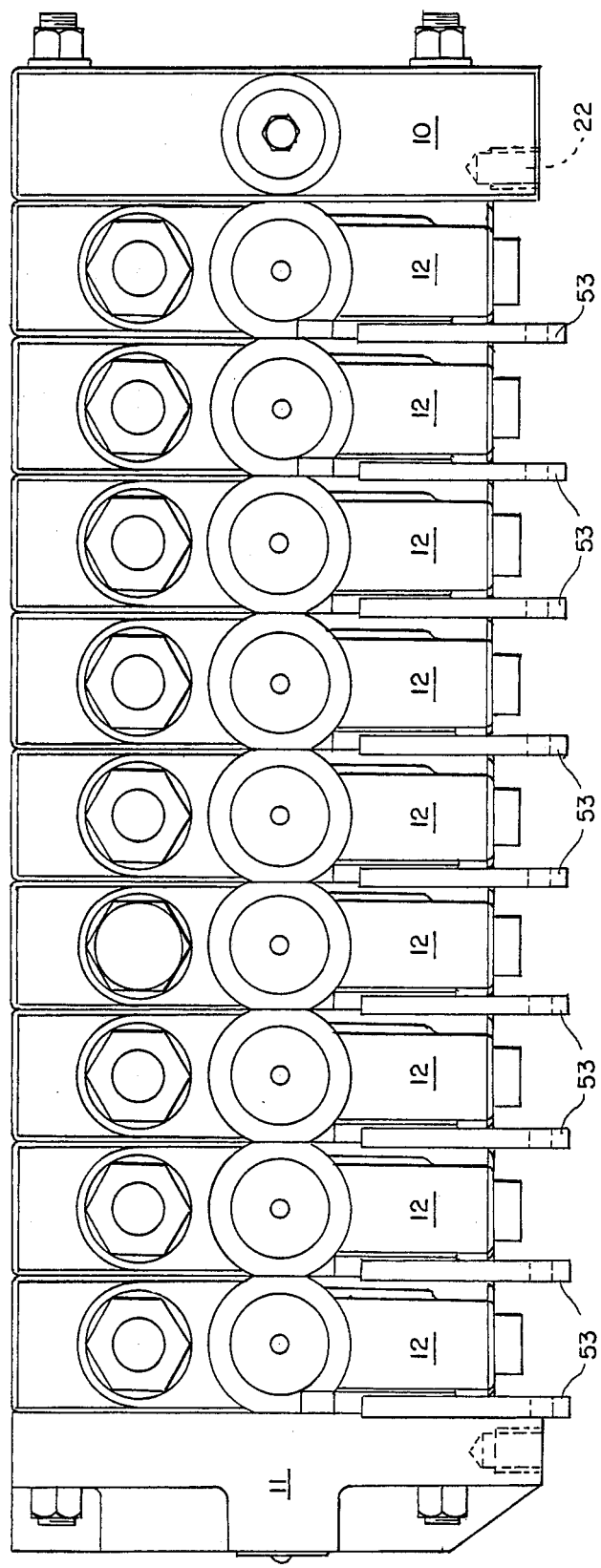
FIG. 2 is a side elevational view of the valve bank of FIG. 1.
Figure 4:
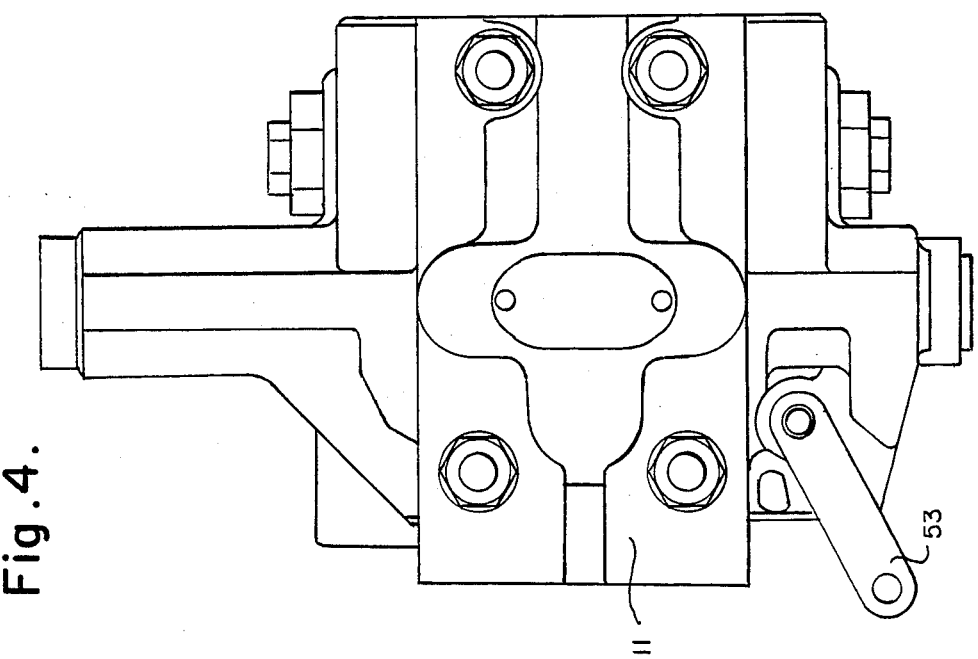
FIG. 4 is an end elevational view from the second inlet end of the valve bank of FIG. 1.
Figure 3:
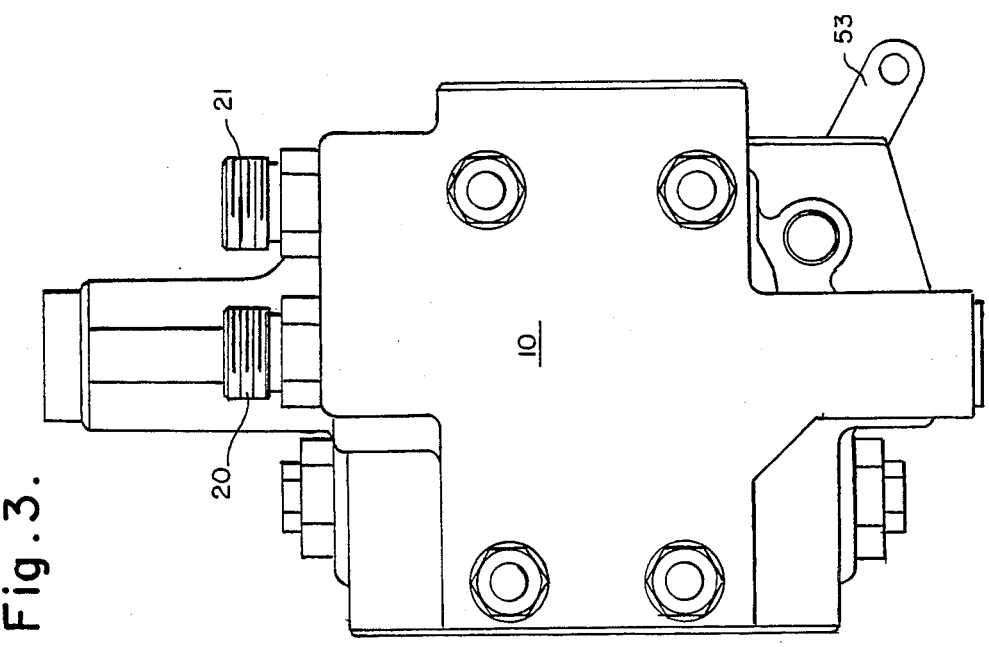
FIG. 3 is an end elevational view from the first inlet section end of the valve bank of FIG. 1.

Referring to the drawings there is illustrated a valve bank according to this invention made up of an inlet section 10, a second inlet section 11 and a plurality of individual intermediate valve work sections 12, which may take any of the forms illustrated in FIGS. 6 through 9, depending upon their desired function.

Figure 5:
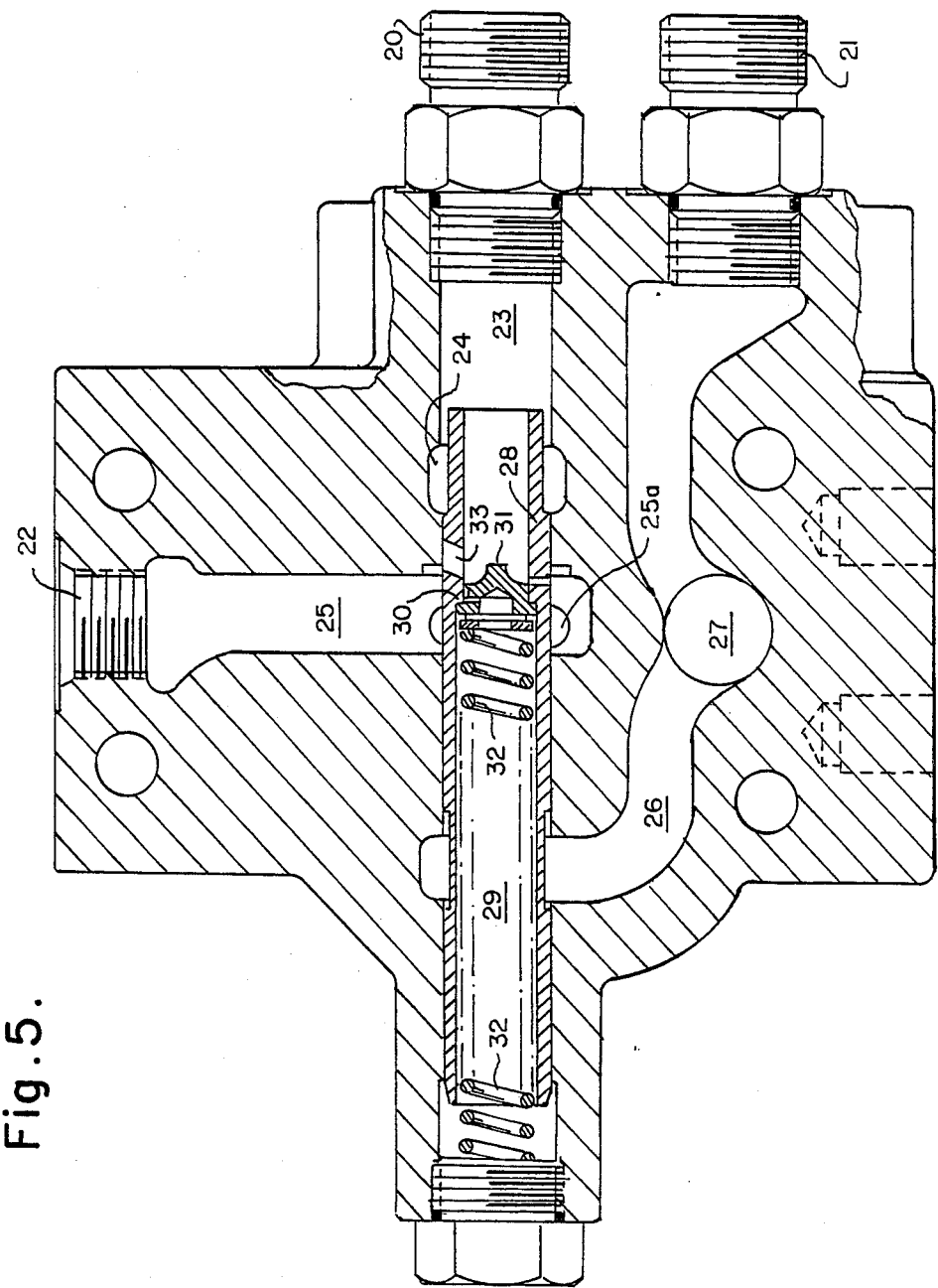
FIG. 5 is a section through a first inlet section of this invention.

The first inlet section 10 is provided with an inlet port 20 which is connected to a source of pressure fluid such as a pump (not shown) and an outlet port 21 connected to a reservoir or tank (not shown). The first inlet section is also provided with a secondary (nonpriority) pressure port 22 threaded to receive a fitting for a ½ inch O.D. tube connected to a like port, described hereafter, on the second inlet section 11. The first inlet section has an inlet passage 23 connected to the inlet port which intersects priority chamber 24 (primary flow); nonpriority chamber 25 (secondary flow), connected to port 22; and tank chamber 26 connected to tank passage 27 and outlet port 21. A pressure control spool 28 is slidably mounted in passage 23 to extend across and close chambers 25 and 26 from passage 23 and to extend into chamber 24. Spool 28 has an inner axial passage 29 having a shoulder 30 intermediate its ends against which an orifice member 31 is pressed by spring 32. The valve spool 28 is urged by spring 32 to close off flow from passage 23 to passage 25 (through radial holes 33). As pressure builds in chamber 23 the spool is moved leftward (viewing FIG. 5) against the spring force to allow secondary flow from passage 23 to passage 25 through holes 33. Chamber 25 feeds fluid to both ends of the valve bank through passage 25a at the first inlet end and port 22 to port 90 in the second inlet section so that even at high flow rates sufficient pressure is maintained in those valve section remotes from the first inlet section and adjacent the second inlet section.

Figure 6:
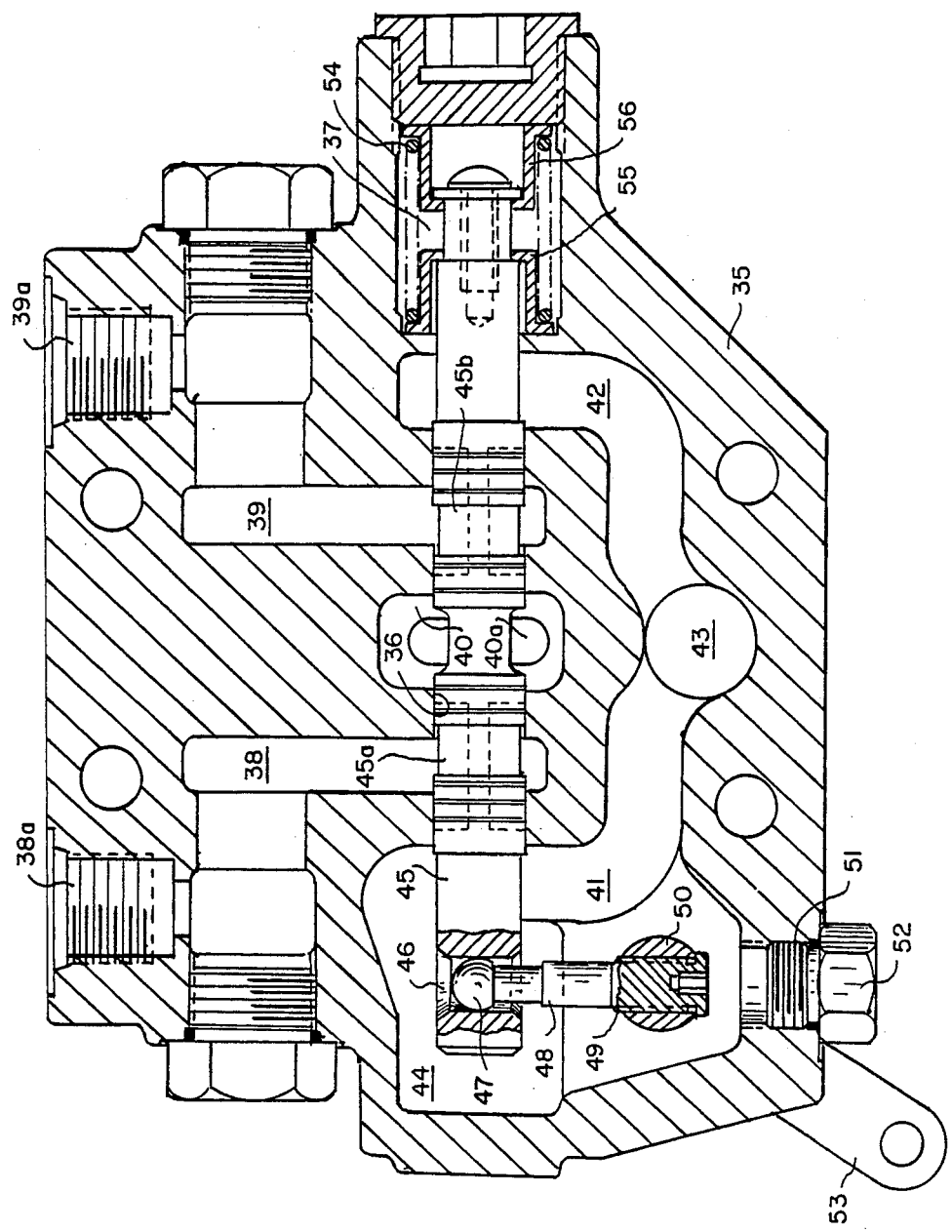
FIG. 6 is a section through a work section not vented to tank in neutral.
Figure 7:
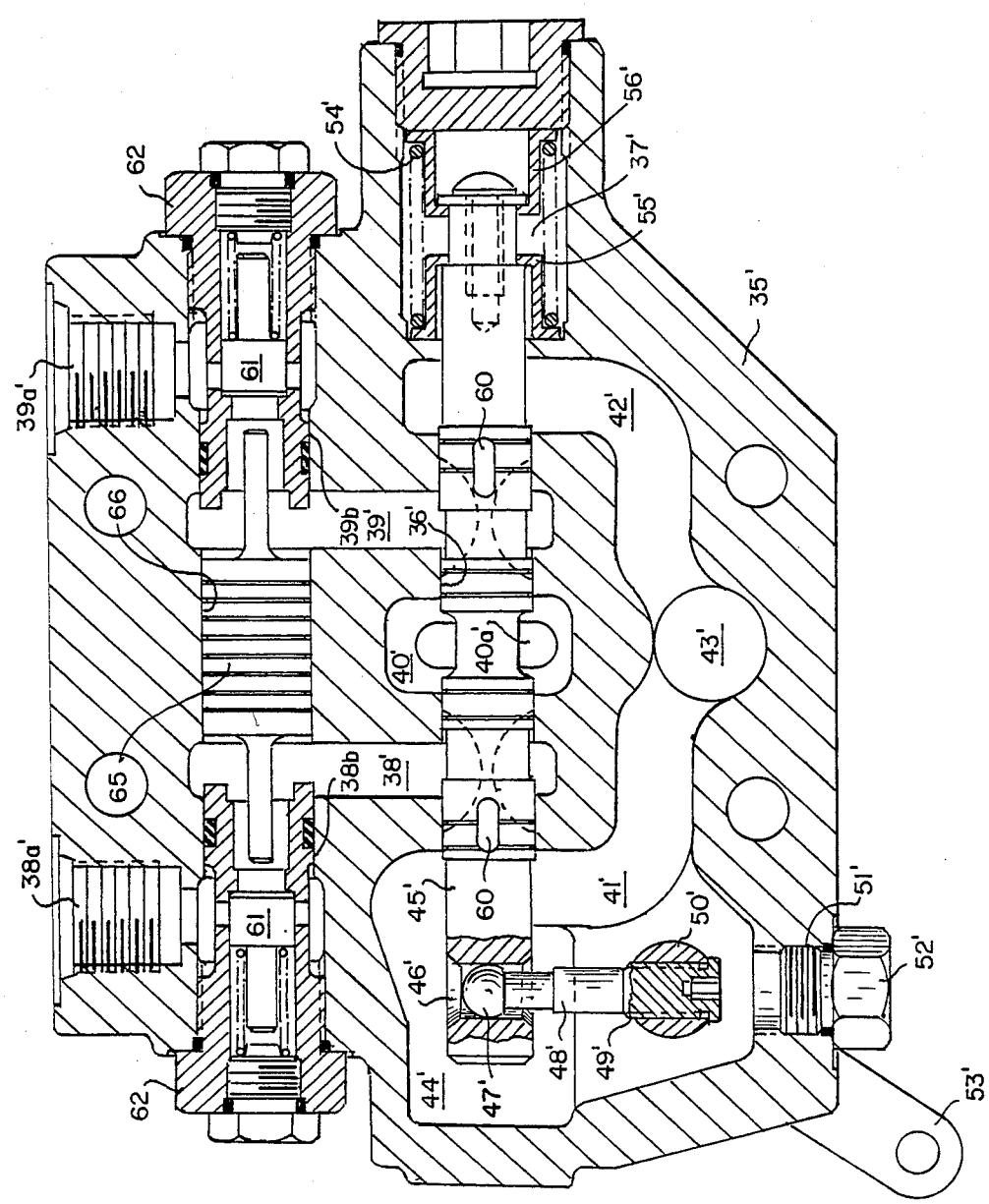
FIG. 7 is a section through a work section vented to tank in netural with load holding checks.
Figure 8:
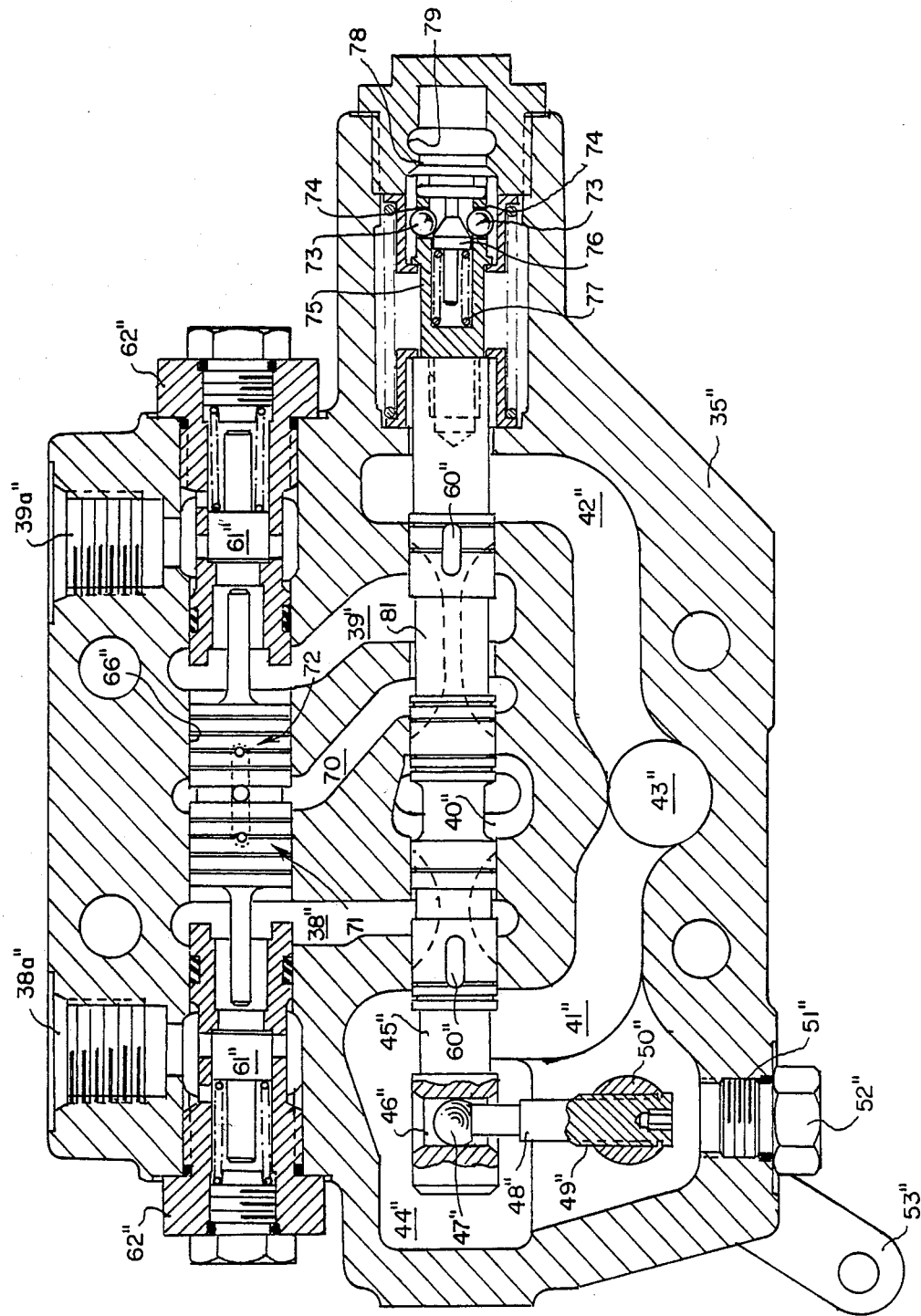
FIG. 8 is a section through a work section vented to tank at neutral with load holding checks and detented position float.
Figure 9:
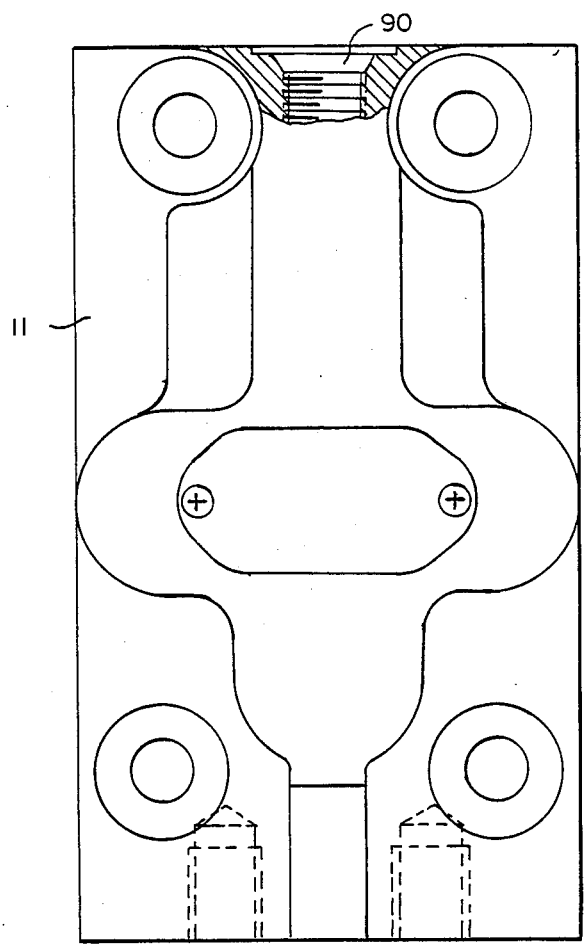
FIG. 9 is an elevation, partly in section of the second inlet section.
Figure 10:
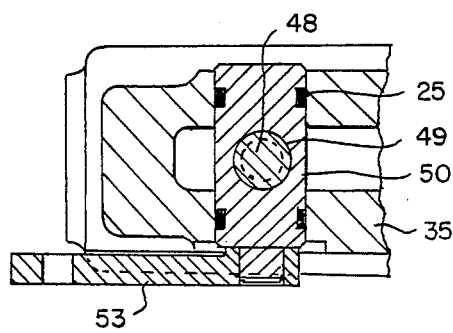
FIG. 10 is a section showing the input lever.

The intermediate sections 12 may take one of several forms, as illustrated in FIGS. 6 through 8. In FIG. 6, there is illustrated a four way valve according to the invention. This valve has a housing 35 having a passage 36 extending out of one end of the housing through a tank chamber 37 in which centering springs are located. Passage 36 extends through two spaced work chambers 38 and 39, a pressure chamber 40 between the work chambers, a pair of tank chambers 41 and 42 on opposite sides of the work chambers and a control chamber 44 opening into tank chamber 41. The work chambers 38 and 39 are connected to work ports 38a and 39a. Pressure chamber 40 is connected through an inlet port 40a with the pressure passage 25a of the inlet section. The tank chambers 41 and 42 connect with tank passage 43 extending transversely of housing 35 and connecting with outlet passage 27 of the first inlet section. A valve spool 45 is movable axially in passage 36. One end of spool 45 is located in control chamber 44 and is provided with a socket 46 adapted to receive a ball connection 47 on one end of a drive lever 48. The other end of drive lever 48 is threaded in an opening 49 in shaft 50 journaled in housing 35. An opening 51 is provided in housing 35 in alignment with the axis of drive lever 48 when spool 45 is in the neutral position, which opening is normally closed by threaded plug 52. If it is desired to remove drive lever 48 from shaft 50, plug 52 is removed through opening 51. This leaves the end of spool 45 free from the drive. One end of shaft 50 passes through a bearing and seal in the wall of housing 35 and is connected to an external operating lever 53. The opposite the opposite end of shaft 50 passes through a bearing and seal in the opposite wall of housing 35 so that no net axial force can be applied on shaft 50 by hydraulic pressure existing in control chamber 44.

The opposite end of spool 45 is connected with a conventional centering mechanism made up of a spring 54 between spring guides 55 and 56 in tank chamber 37. Centering chamber 37 is closed by plug 57 of conventional form.

In operation, movement of lever 48 counterclockwise (viewing FIG. 6) causes spool 45 to move to the left. This movement connects work chamber 38 with tank chamber 41 through valley (slot) 45a on spool 45. In turn, work chamber 39 is connected with pressure chamber 40 through valley (slot) 45b on spool 45. Clockwise movement of lever 48 reverses the work chamber connections.

In FIG. 7 there is illustrated a modification of the valve of FIG. 6 which is vented to tank in netural and which incorporates load holding check valves. Like parts are identified by like numbers with a prime sign. In this configuration the spool 45′ is provided with slots 60, which in the neutral (center) position, as illustrated in FIG. 7, connect work chambers 38′ and 39′ with the adjacent exhaust chambers 41′ and 42′ respectively. Each of work chambers 38′ and 39′ are separated from their respective work ports 38a′ and 39a′ by a load holding check 61 in cartridge 62 inserted in passages 38b and 39b between work chambers 38′ and 39′ and work ports 38a′ and 39a′. A pilot piston 65 moving in passage 66 between work chamber 38′ and 39′ moves under work port pressure to open one or the other of load holding checks 61 after the spool mvoes to shut off the work port to tank connection. The spool arrangement is such that in the neutral position the work chambers are both connected to adjacent tank chambers and, on movement in either direction, all chambers are first isolated and then one work chamber is pressurized which actuates pilot piston 61 to open the load holding check to the other work chamber that is to be exhausted to tank.

In FIG. 8, there is illustrated a modification of the valve of FIG. 7 incorporating a detented fourth position float. Like parts are identified by like numbers with a double prime sign. In this configuration, in addition to the inclusion of slots 60″ to function as in FIG. 7, there is another chamber 70 in housing 35″ between pressure chamber 40″ and work chamber 39″. A pair of pilot pistons 71 and 72 are operatively movable in passage 66″ between work chambers 38″ and 39″ and chamber 70 intersects passage 66″ between these pistons 71 and 72. The end of spool 45″ is provided with detent balls 73 held in openings 74 in ball carrier 75 by a conical piston 76 loaded by spring 77 against pin 6. The balls are not forced into contact with any part of the housing until spool 45″ is moved to the right, viewing FIG. 8 to contact land 78 in advance of detent 79. When balls 73 contact land 78 they meet their first resistance and then enter detent 79 where the valve is held in the float position. In this position pressure fluid from chamber 40″ enters chamber 70 to act on pilot pistons 71 and 72 to urge them apart into contact with load checks 61″ to open them into chambers 38″ and 39″ which are in turn connected with tank chamber 41″ and 42″ through valley 80 and 81 on spool 45″. This structure is unique in providing dual pistons to open both load holding checks when the spool is in the float for fourth position and in the fact that the detent arrangement does not cause any frictional drag on the spool until immediately prior to its entering the detent. In positions of the spool 45″ off of center but not into the fourth float position the load holding checks 61″ are operated by 71 and 72 acting as a single piston as in FIG. 7.

The second inlet section 11 provides a connection to the pressure chamber 40 and a termination to tank passage 43 of the preceding working section 12 in the valve bank. In addition it is provided with an inlet passage 90 (connected to passage 40 (40′–40″). Inlet passage 90 is externally connected with the nonpriority passage 25 of the first inlet section by an appropriate piping connection (not shown), such as a ½ inch tube or the like, which is parallel to the internal passage 40.

In the above description and accompanying drawings, I have illustrated a valve bank made up of individual bolted together housing sections, each with a valve spool, however it could be made up of single housings with two or more spools and one or two inlets in one or more housings.

In the foregoing specification I have set out certain preferred practices and embodiments of this invention, however, it will be understood that this invention may be otherwise embodied within the scope of the following claims.

I claim:

1. A fluid valve structure comprising a first inlet section separately connected to a source of pressure fluid and to a reservoir, a second inlet section spaced from said first inlet section, a plurality of side by side valve sections between said first inlet and second inlet sections each having a housing with at least one inlet chamber, a work chamber and a tank chamber intersected by a passage open at opposite ends to a control chamber intersected by a passage open at opposite ends to a control chamber and a tank chamber at a common pressure, a valve spool having both ends in said chamber at a common pressure and being movable in said passage, said spool having spaced grooves adapted in one position to connect said work chamber to the inlet chamber and in a second position to connect the work chamber with a tank chamber, lever means in said control chamber engaging one end of the valve spool, said lever means being rotatable about a shaft whose axis is transverse to and spaced from the axis of spool valve, seals and bearings in said housing through which both ends of said shaft pass to the outside of the valve housing, handle means external of the housing acting on the shaft means to rotate the lever means whereby the valve spool moves axially in the passage, said shaft, lever means and valve spool being fully enclosed within the valve housing in all operative positions, said lever means being threadingly removably engaged in said shaft, stop means on the lever means fixing the operative position of the lever means in said shaft, and wherein said housing is provided with an opening and closure therefor through which the lever means may be removed from the shaft and from the housing leaving the valve spool free in said passage.

2. A fluid valve structure as claimed in claim 1 wherein the shaft and handle means are axially located by the engagement of the lever means in the spool.

3. A fluid valve structure as claimed in claim 1 wherein each spool has a centering mechanism for automatically centering the spool when the lever means is not actuated.

4. A fluid valve structure as claimed in claim 1 or 2 or 3 wherein at least one valve section has a spool with slots which connect each work chamber with an adjacent exhaust chamber when the spool is centered in its passage.

5. A fluid valve structure as claimed in claim 4 wherein each work chamber is provided with a load holding check and a passage connecting said work chambers carrying a pilot piston operative on pressure from one work chamber to move the pilot piston to open the load check in the other work chamber.

6. A fluid valve structure as claimed in claim 5 wherein the valve slots are arranged for timing sequence such that on movement of the valve spool from its center position in either direction it sequentially closes any connection between work chamber and exhaust chambers, opens a work chamber to the pressure chamber and finally opens the other work chamber to exhaust.

7. A fluid valve structure as claimed in claim 5 having a signal chamber between one work chamber and the pressure chamber intersecting the passage between the work chambers, a pair of pilot pistons in said passage between the work chambers, each having a pressure surface open to said signal chamber whereby when the spool is moved to connect one of the work chambers to an adjacent tank chamber the pressure chamber is connected to the opposite work chamber and the two pilot pistons move together to open the load holding check connecting the said one work chamber to the adjacent tank chamber.

8. A fluid valve structure as claimed in claim 10 having a detented position on said spool in which the spool connects both work chambers with an adjacent tank chamber, means for holding said spool in said detent position, whereby when the spool is moved to said detent position, the pressure chamber is connected to said signal chamber and the two pilot pistons move apart to open both load holding checks connecting each work chamber to the adjacent tank chambers.

9. A fluid valve structure as claimed in claim 4 wherein the valve grooves are arranged for timing sequence such that on movement of the valve spool from its center position in either direction it sequentially closes any connection between work chamber and exhaust chambers, opens a work chamber to the pressure chamber and finally opens the other work chamber to exhaust.

10. A fluid valve structure as claimed in claim 4 wherein each work chamber is provided with a load holding check and a passage connects said work chambers carrying a pilot piston operative on pressure from one or the other of the work chambers to move the pilot piston to open the load holding check in the other work chamber, slots, separate from the flow slots to the work chambers, to vent the work chambers to tank when the spool is in its center position, said slots to close the work chambers before either flow slot is opened to pressure and finally opens the opposite work port to tank as the spool is moved from its center position.

11. A fluid valve structure as claimed in claim 1 having a detented position on said spool in which the spool connected both work chambers with an adjacent tank chamber and means for holding said spool in said detent position.

12. A fluid valve structure as claimed in claim 11 wherein the means for holding said spool in the detent position is at least one resiliently mounted ball out of contact with any moving frictional force and a groove with an entering land over which the ball passes to enter the groove.

13. A fluid valve structure comprising a first inlet section separately connected to a source of pressure fluid and to a reservoir, a second inlet section, a plurality of side by side valve sections between said first inlet and second inlet sections each having a housing with at least one inlet chamber, a work chamber and a tank chamber intersected by a passage open at opposite ends to a control chamber and a tank chamber at a common pressure, a valve spool having both ends in said chamber at a common pressure and being movable in said passage, said spool having spaced grooves adapted in one position to connect said work chamber to the inlet chamber and in a second position to connect the work chamber with a tank position, lever means in said control chamber engaging one end of the valve spool, said lever being rotatable about a shaft whose axis is transverse to and spaced from the axis of spool valve, seals and bearings in said housing through which both ends of said shaft pass to the outside of the valve housing, handle means external of the housing acting on the shaft means to rotate the lever whereby the valve spool moves axially in the passage, said shaft, lever and valve spool being fully enclosed within the valve housing in all operative positions and wherein the valve grooves are arranged for timing sequence such that on movement of the valve spool from its center position in either direction it sequentially closes any connection between work chamber and exhaust chambers, opens a work chamber to the pressure chamber and finally opens the other work chamber to exhaust.

14. A fluid valve structure as claimed in claim 13 wherein a parallel pressure passage is provided from the first inlet section to a second inlet section such that pressure fluid is provided at two points in the valve bank to minimize pressure drop to sections remote from the first inlet.

15. A fluid valve structure as claimed in claim 14 wherein the first inlet section contains a pressure actuated priority valve that gives fluid flow to a primary function priority over fluid flow to second functions.

16. A fluid valve structure as claimed in claim 13 wherein the shaft and handle means are axially located by the engagement of the lever means in the spool.

17. A fluid valve structure as claimed in claim 13 wherein each spool has a centering mechanism for automatically centering the spool when the lever means is not actuated.

18. A fluid valve structure as claimed in one of claims 13, 16 or 17 wherein each work chamber is provided with a load holding check and a passage connecting said work chambers carrying a pilot piston operative on pressure from one work chamber to move the pilot piston to open the load check in the other work chamber.

19. A fluid valve structure as claimed in claim 18 having a signal chamber between one work chamber and the pressure chamber intersecting the passage between the work chambers, a pair of pilot pistons in said passage between the work chambers, each having a pressure surface open to said signal chamber whereby when the spool is moved to connect one of the work chambers to an adjacent tank chamber the pressure chamber is connected to the opposite work chamber and the two pilot pistons move together to open the load holding check connecting the said one work chamber to the adjacent tank chamber.

20. A fluid valve structure as claimed in claim 19 having a detented position on said spool in which the spool connects both work chambers with an adjacent tank chamber, means for holding said spool in said detent position, whereby when the spool is moved to said detent position, the pressure chamber is connected to said signal chamber and the two pilot pistons move apart to open both load holding checks connecting each work chamber to the adjacent tank chambers.

21. A fluid valve structure as claimed in claim 18 having a signal chamber between one work chamber and the pressure chamber intersecting the passage between the work chambers, a pair of pilot pistons in said passage between the work chambers, each having a pressure surface open to said signal chamber whreby when the spool is moved to connect one of the work chambers to an adjacent tank chamber the pressure chamber is connected to the opposite work chamber and the two pilot pistons move together to open the load holding check connecting the said one work chamber to the adjacent tank chamber.

22. A fluid valve structure as claimed in claim 21 having a detented position on said spool in which the spool connects both work chambers with an adjacent tank chamber, means for holding said spool in said detent position, whereby when the spool is moved to said detent position, the pressure chamber is connected to said signal chamber and the two pilot pistons move apart to open both load holding checks connecting each work chamber to the adjacent tank chambers.

23. A fluid valve structure as claimed in claim 13 having a detented position on said spool in which the spool connected both work chambers with an adjacent tank chamber and means for holding said spool in said detent position.

24. A fluid valve structure as claimed in claim 23 wherein the means for holding said spool in the detent position is at least one resiliently mounted ball out of contact with any moving frictional force and a groove with an entering land over which the ball passes to enter the groove.

25. A fluid valve structure comprising a first inlet section separately connected to a source of pressure fluid and to a reservoir, a second inlet section, a plurality of side by side valve sections between said first inlet and second inlet sections each having a housing with at least one inlet chamber, a work chamber and a tank chamber intersected by a passage open at opposite ends to a control chamber and a tank chamber at a common pressure, a valve spool having both ends in said chamber at a common pressure and being movable in said passsage, said spool having spaced grooves adapted in one position to connect said work chamber to the inlet chamber and in a second position to connect the work chamber with a tank position, lever means in said control chamber engaging one end of the valve spool, said lever being rotatable about a shaft whose axis is transverse to and spaced from the axis of spool valve, seals and bearings in said housing through wihch both ends of said shaft pass to the outside of the valve housing, handle means external of the housing acting on the shaft means to rotate the lever whereby the valve spool moves axially in the passage, said shaft, lever and valve spool being fully enclosed within the valve housing in all operative positions and wherein each work chamber is provided with a load holding check and a passage connects said work chambers carrying a pilot piston operative on pressure from one or the other of the work chambers to move the pilot piston to open the load holding check in the other work chamber, slots, separate from the flow slots to the work chambers, to vent the work chambers to tank when the spool is in its center position, said slots to close the work chambers before either flow slot is opened to pressure and finally opens the opposite work port to tank as the pool is moved from its center position.

26. A fluid valve structure as claimed in claim 25 having a signal chamber between one work chamber and the pressure chamber intersecting the passage between the work chambers, a pair of pilot pistons in said passage between the work chambers, each having a pressure surface open to said signal chamber whereby when the spool is moved to connect the work chambers to adjacent tank chambers the pressure chamber is connected to the signal chamber and the two pilot pistons move apart to open the load holding checks.

27. A fluid valve structure as claimed in claim 26 wherein the spool position to provide pressure to the signal chamber is a fourth float position beyond the normal metering stroke of the spool.

28. A fluid valve structure as claimed in claim 27 having a spool detenting means to hold the spool in the fourth float position.

29. A fluid actuated valve as claimed in claim 28 wherein a parallel pressure passage is provided from the first inlet section to a second inlet section such that pressure fluid is provided at two points in the valve bank to minimize pressure drop to sections remote from the first inlet.

30. A fluid valve structure as claimed in claim 29 wherein the first inlet section contains a pressure actuated priority valve that gives fluid flow to a primary function priority over fluid flow to second functions.

31. A fluid valve structure as claimed in claim 28 wherein the means for holding said spool in the detent position is such that the detent balls or plungers are spring loaded but are not forced into contact with any port of the non moving wall and a groove with an entering land which the balls or plungers must contact and forced over in order to enter the groove.

32. A fluid actuated valve as claimed in claim 31 wherein a parallel pressure passage is provided from the first inlet section to a second inlet section such that pressure fluid is provided at two points in the valve bank to minimize pressure drop to sections remote from the first inlet.

33. A fluid valve structure as claimed in claim 32 wherein the first inlet section contains a pressure actuated priority valve that gives fluid flow to a primary function priority over fluid flow to second functions.

34. A fluid actuated valve as claimed in claim 27 wherein a parallel pressure passage is provided from the first inlet section to a second inlet section such that pressure fluid is provided at two points in the valve bank to minimize pressure drop to sections remote from the first inlet.

35. A fluid valve structure as claimed in claim 34 wherein the first inlet section contains a pressure actuated priority valve that gives fluid flow to a primary function priority over fluid flow to second functions.

36. A fluid actuated valve as claimed in claim 26 wherein a parallel pressure passage is provided from the first inlet section to a second inlet section such that pressure fluid is provided at two points in the valve bank to minimize pressure drop to sections remote from the first inlet.

37. A fluid valve structure as claimed in claim 36 wherein the first inlet section contains a pressure actuated priority valve that gives fluid flow to a primary function priority over fluid flow to second functions.

38. A fluid actuated valve as claimed in claim 25 wherein a parallel pressure passage is provided from the first inlet section to a second inlet section such that pressure fluid is provided at two points in the valve bank to minimize pressure drop to sections remote from the first inlet.

39. A fluid valve structure as claimed in claim 38 wherein the first inlet section contains a pressure actuated priority valve that gives fluid flow to a primary function priority over fluid flow to second functions.

40. A fluid valve structure as claimed in claim 25 wherein the shaft and handle means are axially located by the engagement of the lever means in the spool.

41. A fluid valve structure as claimed in claim 25 wherein each spool has a centering mechanism for automatically centering the spool when the lever means is not actuated.

42. A fluid valve structure as claimed in one of claims 25, 40, or 41 wherein each work chamber is provided with a load holding check and a passage connecting said work chambers carrying a pilot piston operative on pressure from one work chamber to move the pilot piston to open the load check in the other work chamber.

43. A fluid valve structure as claimed in claim 25 having a detented position on said spool in which the spool connected both work chambers with an adjacent tank chamber and means for holding said spool in said detent position.

44. A fluid valve structure as claimed in claim 43 wherein the means for holding said spool in the detent position is at least one resiliently mounted ball out of contact with any moving frictional force and a groove with an entering land over which the ball passes to enter the groove.

* * * * *

UNITED STATES PATENT AND TRADEMARK OFFICE
CERTIFICATE OF CORRECTION

PATENT NO. : 4,789,002

DATED : December 6, 1988

INVENTOR(S) : ARTHUR WILLIAMS

It is certified that error appears in the above-identified patent and that said Letters Patent is hereby corrected as shown below:

Column 1, line 18, change "uses" to --use--.

Column 4, line 10, after "removed" insert --from opening 51 and lever 48 is threaded out of hole 49 and removed--.

Column 4, line 47, change "mvoes" to --moves--.

Column 5, Claim 1, lines 49-50, delete the second occurrence of "intersected by a passage open at opposite ends to a control chamber".

Signed and Sealed this

Thirtieth Day of May, 1989

Attest:

DONALD J. QUIGG

Attesting Officer

Commissioner of Patents and Trademarks